United States Patent
Yoshimura et al.

(10) Patent No.: US 8,983,463 B2
(45) Date of Patent: Mar. 17, 2015

(54) MOBILE COMMUNICATION SYSTEM, LOCATION REGISTRATION METHOD, RELAY NODE AND CONTROL METHOD THEREOF, AND STORAGE MEDIUM OF CONTROL PROGRAM

(75) Inventors: Yozo Yoshimura, Tokyo (JP); Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 227 days.

(21) Appl. No.: 13/487,770

(22) Filed: Jun. 4, 2012

(65) Prior Publication Data

US 2012/0315903 A1 Dec. 13, 2012

(30) Foreign Application Priority Data

Jun. 7, 2011 (JP) .................. 2011-127039

(51) Int. Cl.
*H04W 60/00* (2009.01)
*H04W 60/04* (2009.01)
*H04W 84/04* (2009.01)

(52) U.S. Cl.
CPC ............ *H04W 60/04* (2013.01); *H04W 84/047* (2013.01)
USPC .................. 455/435.1; 455/404.2; 455/456.1; 455/456.6; 455/522; 455/436

(58) Field of Classification Search
CPC ....... H04W 60/00; H04W 4/028; H04W 4/22; H04W 52/283; H04W 36/18; H04W 52/40; H04M 1/72538; H04M 2250/52; H04M 2250/12; H04M 2250/10
USPC ............ 455/435.1, 404.2, 456.1, 456.6, 522, 455/436, 69
See application file for complete search history.

(56) References Cited

U.S. PATENT DOCUMENTS

2011/0255511 A1* 10/2011 Ikeda ............................ 370/331
2012/0083292 A1* 4/2012 Yeo et al. .................... 455/456.6

FOREIGN PATENT DOCUMENTS

| EP | 1244321 B1 | 1/2005 | |
| JP | 2004-304351 A | 10/2004 | |
| JP | 2006-157957 A | 6/2006 | |
| KR | 10-2009-0121938 | * 11/2009 | ............... H04B 7/14 |
| KR | 10-2009-0121938 A | 11/2009 | |
| WO | WO 2010/073620 A | 7/2010 | |
| WO | WO2010/124457 A1 | 11/2010 | |

OTHER PUBLICATIONS

TS36.413 of 3GPP.*
Extended European Search Report mailed Oct. 9, 2014 in related European application No. 12170675.8 (8 pgs.).

* cited by examiner

*Primary Examiner* — Kashif Siddiqui
*Assistant Examiner* — Farideh Madani
(74) *Attorney, Agent, or Firm* — Foley & Lardner LLP

(57) ABSTRACT

A communication processing system includes a user equipment, a base station and a relay node for relaying the user equipment and the base station. The relay node includes a timer unit which measures a prescribed time after detecting movement between tracking areas and a user equipment registration unit which registers the user equipment, which is a transmission source of a location registration request signal to a location information management unit, which manages location information, received by the relay node during the prescribed period, as a subordinate of the relay node.

9 Claims, 16 Drawing Sheets

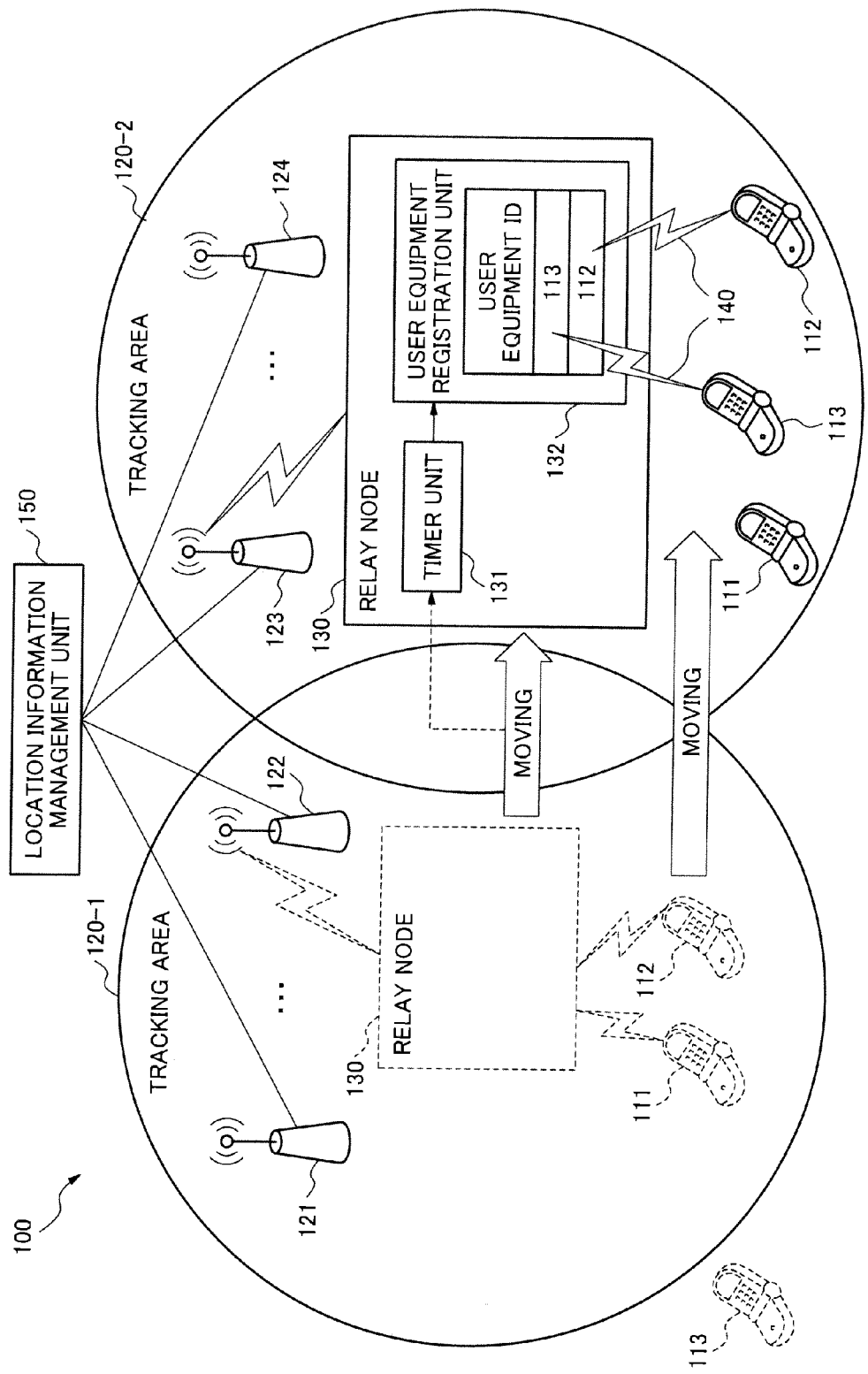

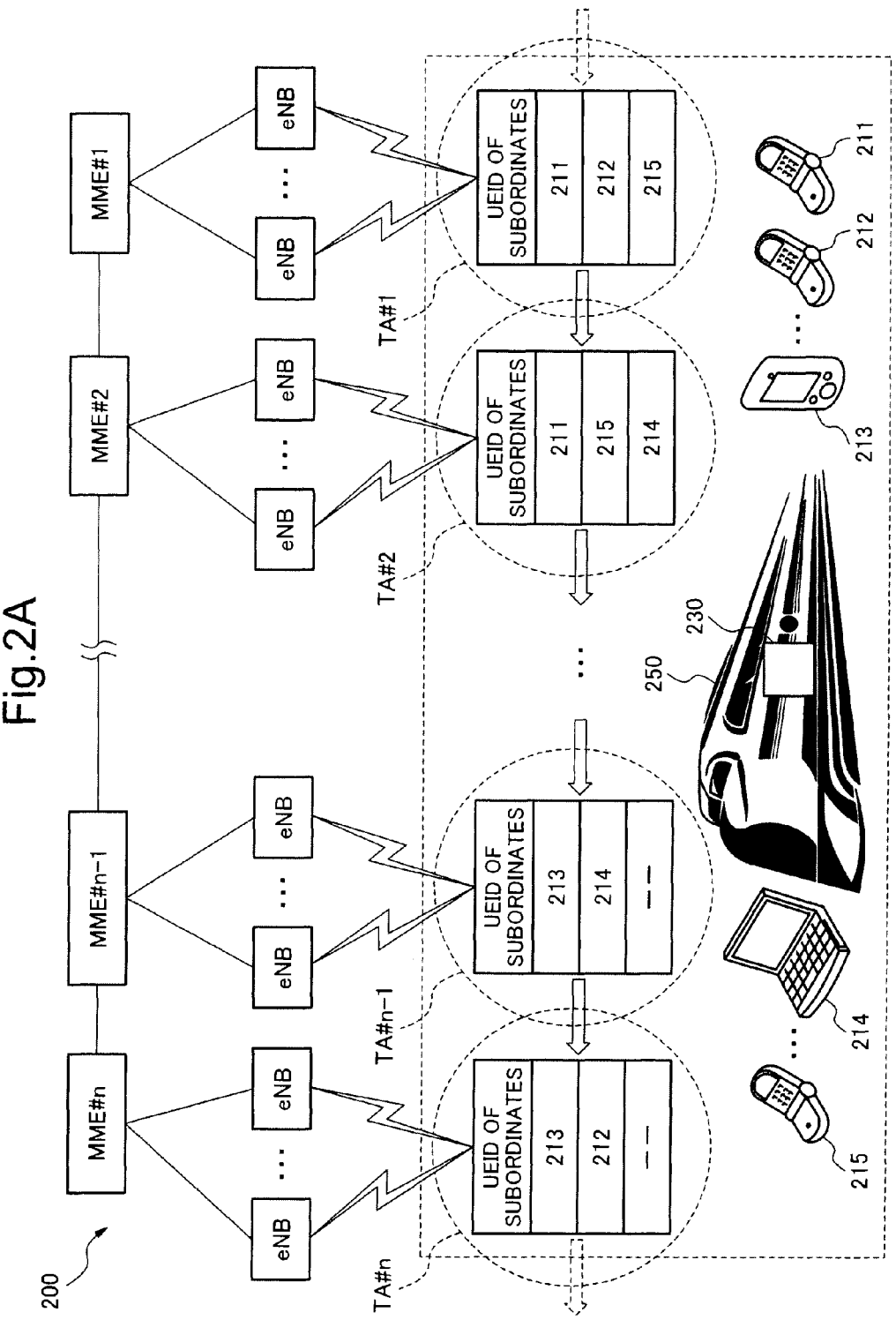

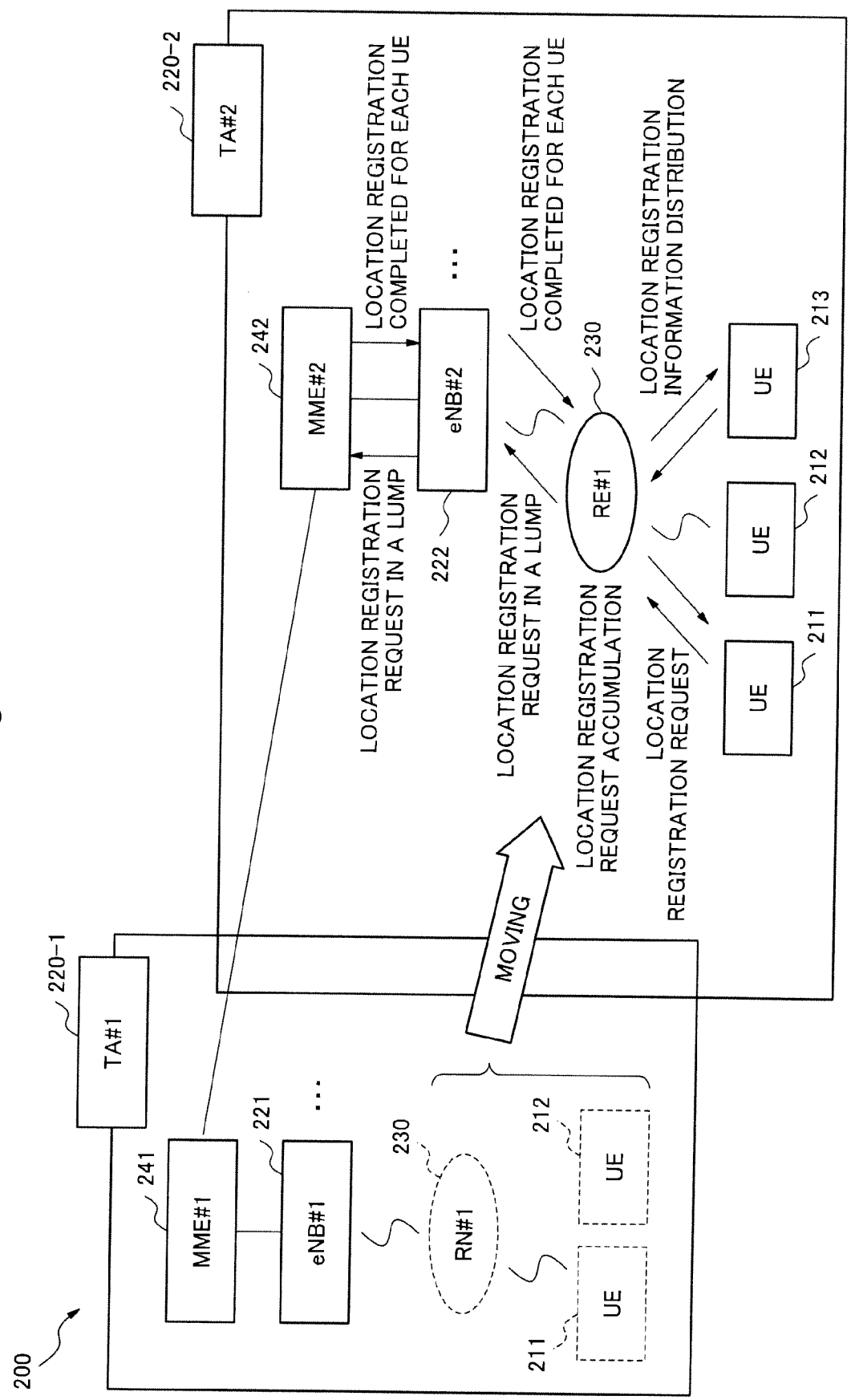

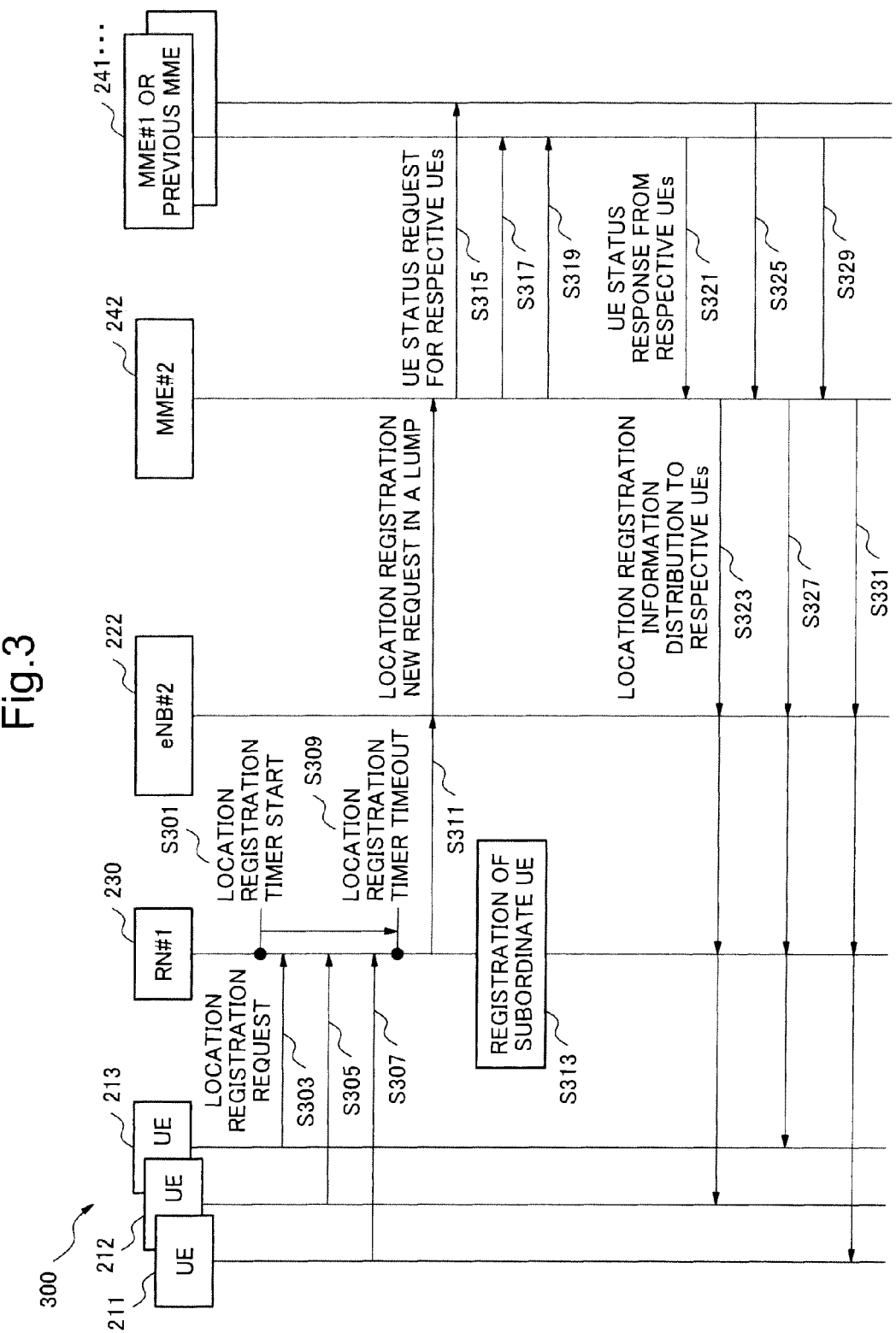

Fig.4

3GPP TS36.413 9.1.7.3 UPLINK NAS TRANSPORT Direction: eNB→MME

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UEUE S1AP ID | M | | 9.2.3.3 | | YES | reject |
| eNB UEUE S1AP ID | M | | 9.2.3.4 | | YES | reject |
| NAS-PDU | M | | 9.2.3.5 | | YES | reject |
| E-UTRAN CGI | M | | 9.2.1.38 | | YES | ignore |
| TAI | M | | 9.2.3.16 | | YES | ignore |
| GW Transport Layer Address | O | | Transpot Layer Address 9.2.2.1 | Indicating GW Transport Layer Address if the GW is collocated with eNB | YES | ignore |
| NAS-PDUList | | 0 to <maxno ofNAS-PDUs | | | GLOBAL | ignore |
| >NAS-PDU | M | | 9.2.3.5 | | | |

401

| Range bound | Explanation |
|---|---|
| maxnoofNAS-PDUs | Maximum no. of NAS-PDUs within the NAS-PDU List. ValueUE is 256. |

3GPP TS36.413 9.1.7.2 DOWNLINK NAS TRANSPORT  Direction: MME→eNB

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UEUE S1AP ID | M | | 9.2.3.3 | | YES | reject |
| eNB UEUE S1AP ID | M | | 9.2.3.4 | | YES | reject |
| NAS-PDU | M | | 9.2.3.5 | | YES | reject |
| Handover Restriction List | O | | 9.2.1.22 | | YES | ignore |
| Subscriver Profile ID for RAT/Frequency priority | O | | 9.2.1.39 | | YES | ignore |

500

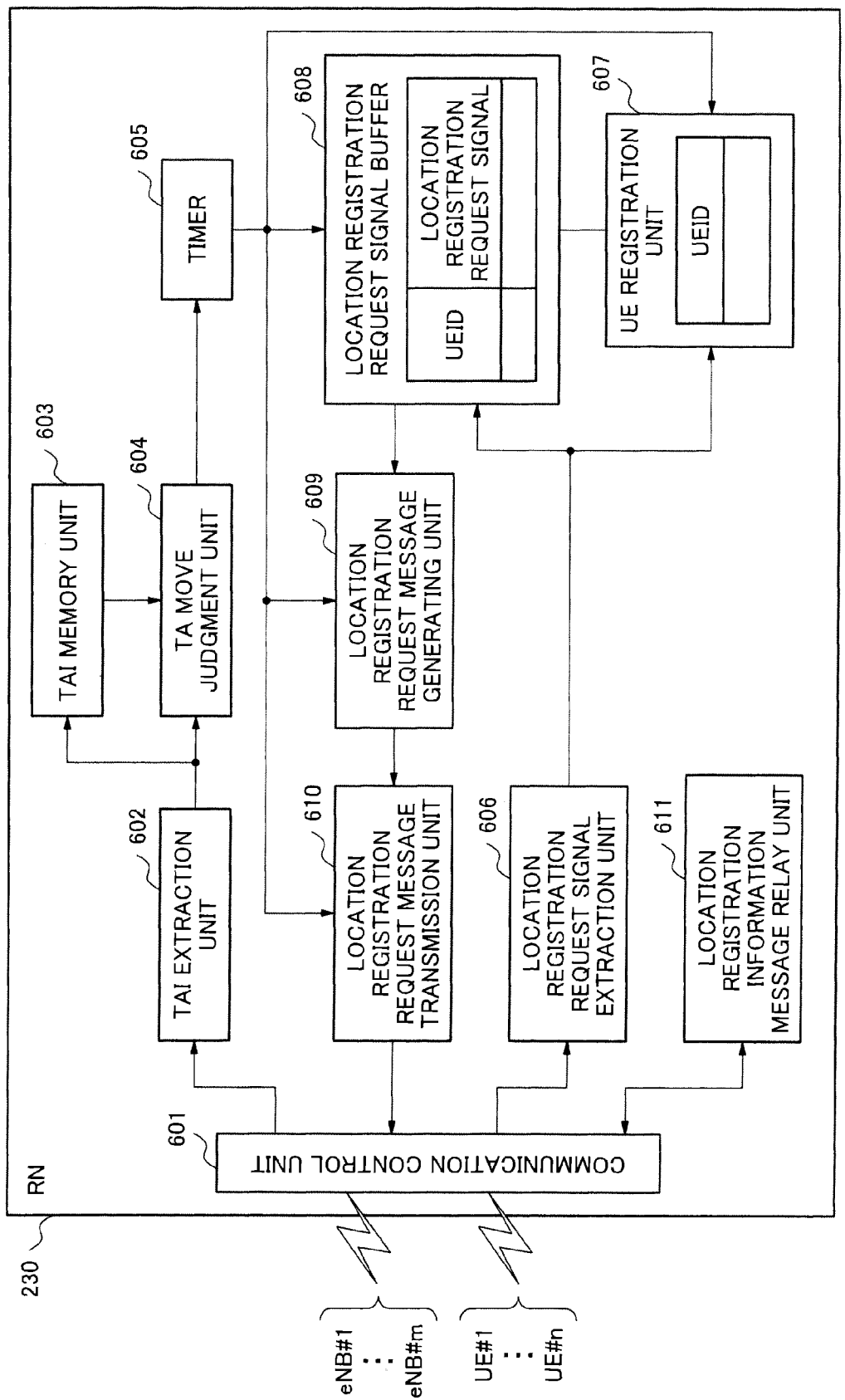

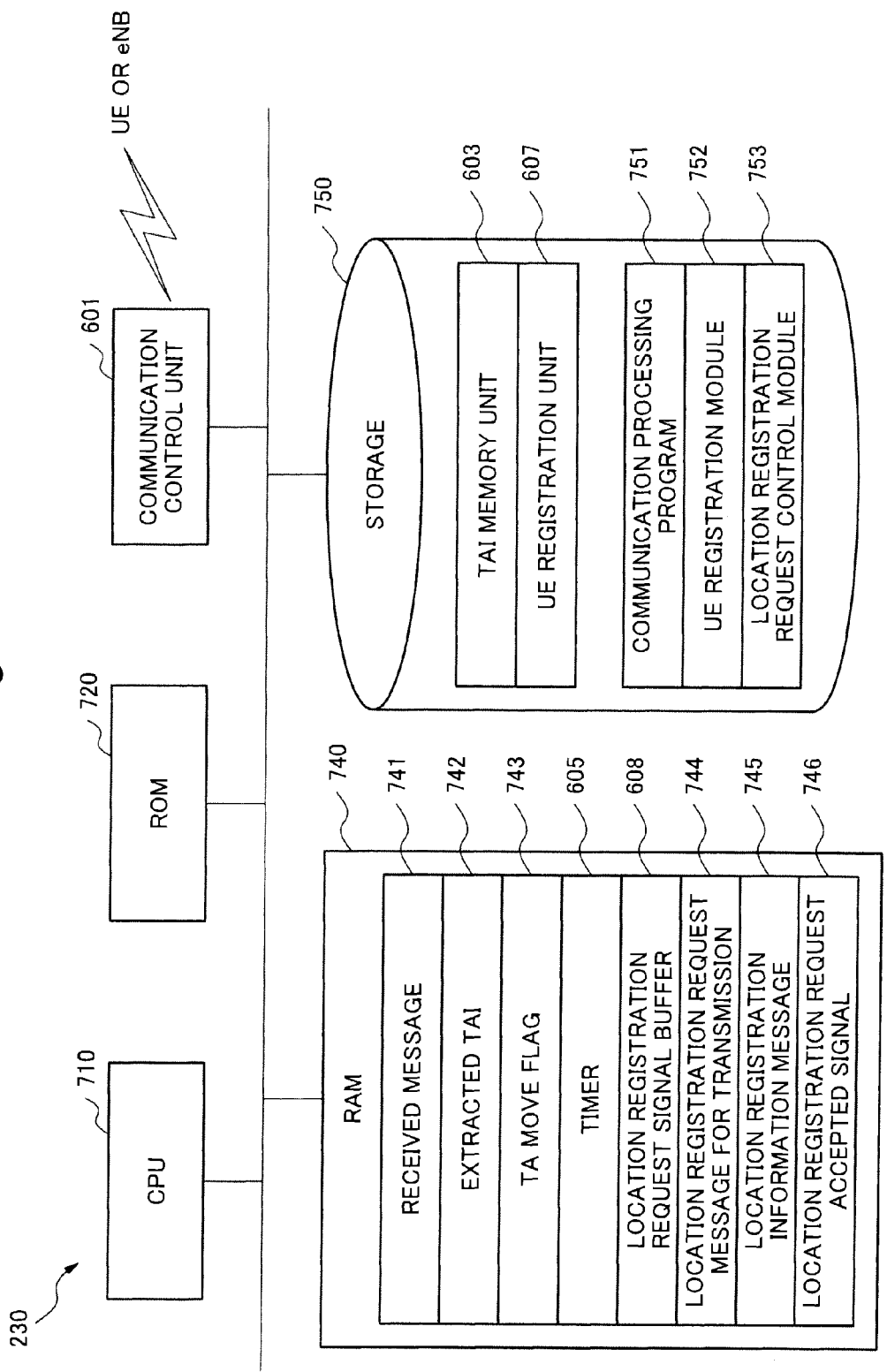

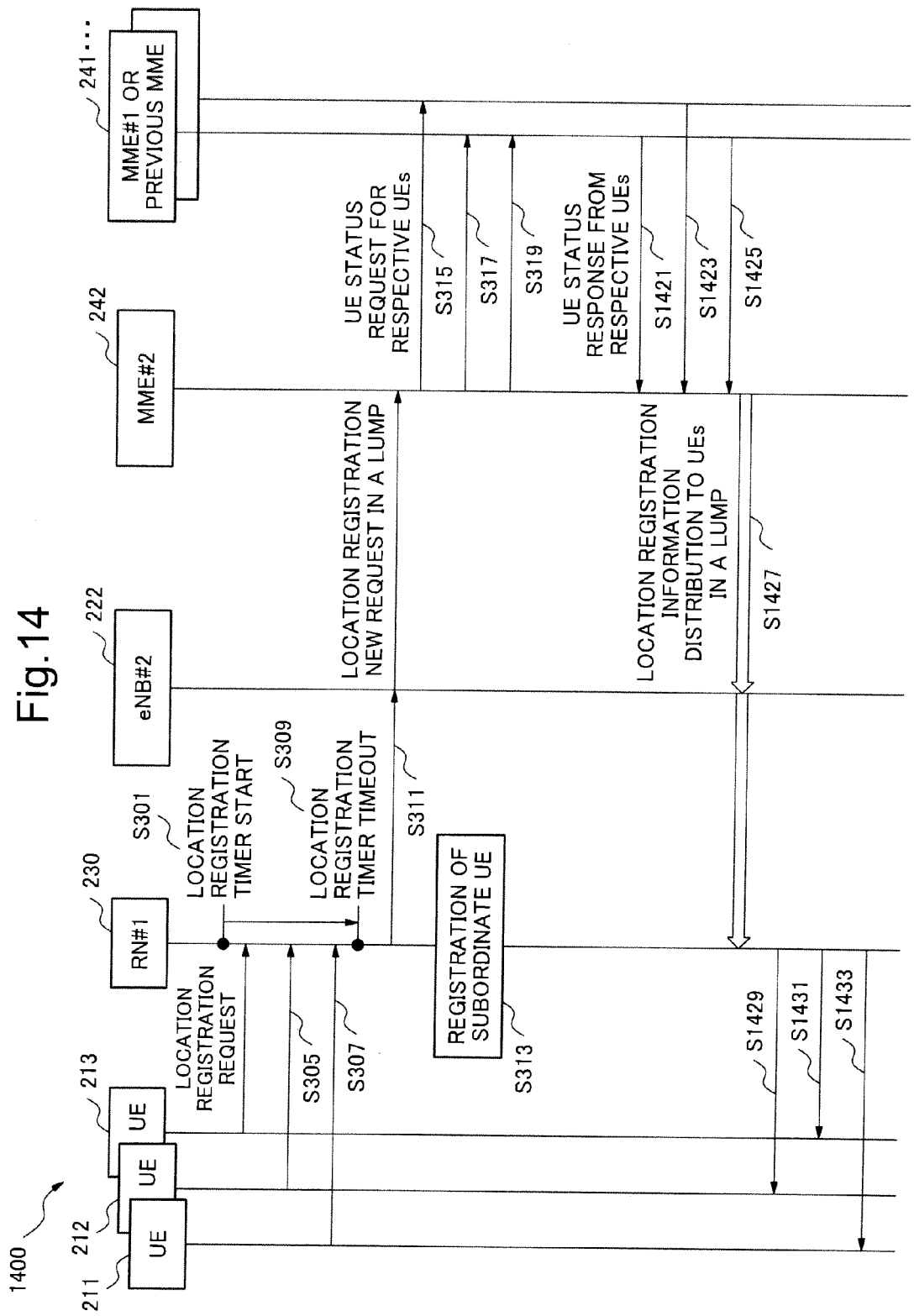

Fig.15

3GPP TS36.413 9.1.7.2 DOWNLINK NAS TRANSPORT   Direction: MME→eNB

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UEUE S1AP ID | M | | 9.2.3.3 | | YES | reject |
| eNB UEUE S1AP ID | M | | 9.2.3.4 | | YES | reject |
| NAS-PDU | M | | 9.2.3.5 | | YES | reject |
| Handover Restriction List | O | | 9.2.1.22 | | YES | ignore |
| Subscriver Profile ID for RAT/Frequency priority | O | | 9.2.1.39 | | YES | ignore |
| NAS-PDUList | O | 0 to <maxno ofNAS-PDUs | | | GLOBAL | ignore |
| >NAS-PDU | M | | 9.2.3.5 | | | |

| Range bound | Explanation |
|---|---|
| maxnoofNAS-PDUs | Maximum no. of NAS-PDUs within the NAS-PDU List. ValueUE is 256. |

MOBILE COMMUNICATION SYSTEM, LOCATION REGISTRATION METHOD, RELAY NODE AND CONTROL METHOD THEREOF, AND STORAGE MEDIUM OF CONTROL PROGRAM

This application is based upon and claims the benefit of priority from Japanese Patent Application No. 2011-127039, filed on Jun. 7, 2011, the disclosure of which is incorporated herein in its entirety by reference.

TECHNICAL FIELD

The present invention relates to technology of location registration in a mobile communication system.

BACKGROUND ART

As technology of location registration in a mobile communication system, the technology shown in Japanese Patent Application Publication No. 2004-304351 (hereinafter, referred to as "patent document 1"), in which a moving base station reports location registration requests received from cellular terminals to a location information management server in a lump, is known. Further, the technology shown in Japanese Patent Application Publication No. 2006-157957 (hereinafter, referred to as "patent document 2"), in which a repeater installed in a moving object updates location registration area information in a lump by sending identification numbers of all subordinate mobile communication terminals to a location information management apparatus together with its own identification number, is known.

However, in the above mentioned technologies, almost all subordinate mobile terminals continue to be registered by a relay node (the moving base station of patent document 1 or the repeater of patent document 2) which is arranged in the moving object and relays between the mobile terminal and the location information management apparatus. For example, in patent document 1, the registration of mobile terminal to the moving base station is performed when a moving base station ID is received. However, unless transfer of the mobile terminal as a subordinate to other base station is confirmed, even if the status of the mobile terminal changes, the mobile terminal keeps being a subordinate of the moving base station. On the other hand, in patent document 2, even if the status of the mobile terminal has changed, the repeater performs the location registration request for all mobile terminals which are being registered in advance as subordinates. Accordingly, the relay node cannot respond quickly to a change of mobile terminal such as power off or entering and exiting from relay node subordinate condition in short time, and performs unnecessary processing, and as a result, the communication data amount is increased and it increases a load of higher rank office.

SUMMARY

An exemplary object of the invention is to provide a mobile communication system, a location registration method, a relay node and control method thereof, and a storage medium of control program for solving a problem of increasing a load of higher rank office due to increase of the communication data amount of the relay node.

A communication processing system according to an exemplary aspect of the invention includes a user equipment, a base station and a relay node for relaying the user equipment and the base station, wherein the relay node includes a timer unit which measures a prescribed time after detecting movement between tracking areas and a user equipment registration unit which registers the user equipment, which is a transmission source of a location registration request signal to a location information management unit, which manages location information, received by the relay node during the prescribed period, as a subordinate of the relay node.

A location registration method according to an exemplary aspect of the invention is for a communication processing system including a user equipment, a base station and a relay node for relaying the user equipment and the base station. The method includes the steps of measuring a prescribed time by the relay node from detecting movement between tracking areas, registering, by the relay node, the user equipment, which is a transmission source of a location registration request signal to a location information management unit, which manages location information, received by the relay node during the prescribed period, as a subordinate of the relay node and transmitting, by the relay node, a plurality of location registration request signals received from the user equipments during the prescribed period to the location information management unit by one location registration request message.

A relay node for relaying a user equipment and a base station according to an exemplary aspect of the invention includes a timer unit which measures a prescribed time from detecting that the relay node has moved between tracking areas and a user equipment registration unit which registers the user equipment, which is a transmission source of a location registration request signal to a location information management unit, which manages location information, received by the relay node during the prescribed period, as a subordinate of the relay node.

An exemplary advantage according to the invention is that it is possible to reduce the communication data amount and suppress a load of higher rank office because the relay node does not perform unnecessary processing by responding quickly to a change of the mobile terminal.

BRIEF DESCRIPTION OF THE DRAWINGS

Exemplary features and advantages of the present invention will become apparent from the following detailed description when taken with the accompanying drawings in which:

FIG. 1 is a block diagram showing a configuration of a communication processing system according to a first exemplary embodiment of the present invention;

FIG. 2A is a figure showing an outline of processing of a communication processing system according to a second exemplary embodiment of the present invention;

FIG. 2B is a block diagram showing a configuration of the communication processing system according to the second exemplary embodiment of the present invention;

FIG. 3 is a sequence diagram showing an operation procedure of the communication processing system according to the second exemplary embodiment of the present invention;

FIG. 4 is a figure showing a composition of a location registration request message of an uplink according to the second exemplary embodiment of the present invention;

FIG. 5 is a figure showing a composition of a location registration information message of a downlink according to the second exemplary embodiment of the present invention;

FIG. 6 is a block diagram showing functional structure of a relay node according to the second exemplary embodiment of the present invention;

FIG. 7 is a block diagram showing a hardware configuration of the relay node according to the second exemplary embodiment of the present invention;

FIG. 14 is a sequence diagram showing an operation procedure of a communication processing system according to a fourth exemplary embodiment of the present invention; and FIG. 15 is a figure showing a composition of a location registration information message of a downlink according to the fourth exemplary embodiment of the present invention.

EXEMPLARY EMBODIMENT

Figure 8:
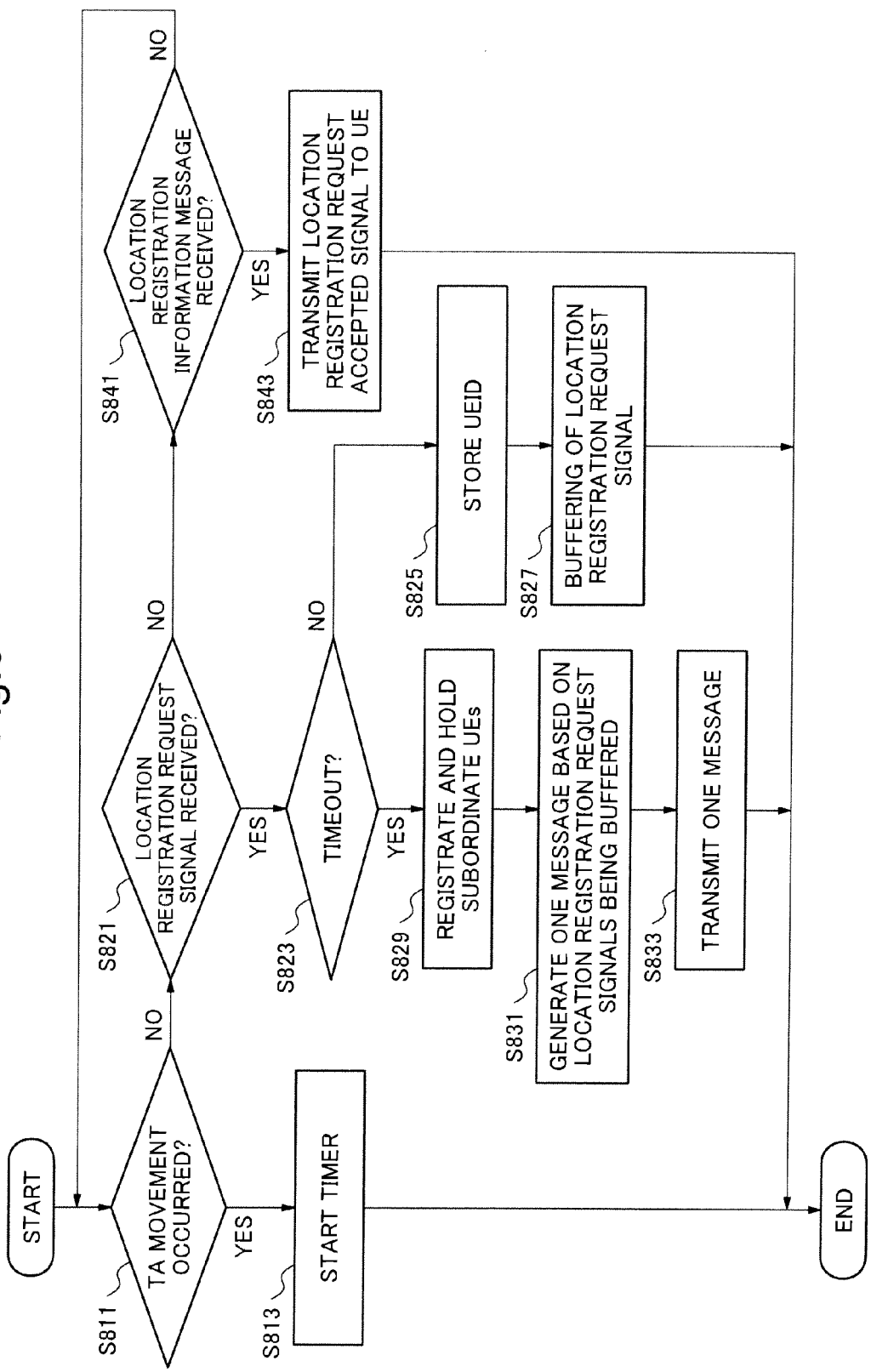
FIG. 8 is a flowchart showing a processing procedure of the relay node according to the second exemplary embodiment of the present invention.

The exemplary embodiments of the present invention will be described in detail exemplarily with reference to drawings below. However, components indicated in the following exemplary embodiments are absolutely illustration, and the technological scope of the present invention should not be limited to only those.

First Exemplary Embodiment

A communication processing system 100 as a first exemplary embodiment of the present invention will be described using FIG. 1. The communication processing system 100 includes user equipments 111-113, base stations 121-124 and a relay node 130 which relays the user equipments 111-113 and the base stations 121-124.

As shown in FIG. 1, the relay node 130 of the communication processing system 100 includes a timer unit 131 and a user equipment registration unit 132. The timer unit 131 measures a prescribed period after detecting movement of the relay node 130 between tracking areas (120-1 and 120-2). The user equipment registration unit 132 registers the user equipments 112, 113, which are transmission sources of location registration request signals 140 to a location information management unit 150, which manages location information, received by the relay node during the prescribed period, as subordinates of the relay node 130.

According to this exemplary embodiment, the user equipment registration unit 132 registers the transmission source user equipments 112, 113 of the location registration request signals 140 having been received during the prescribed period by the relay node as subordinates of the relay node 130. That is, according to this exemplary embodiment, because the relay node does not perform unnecessary location registration processing by responding quickly to a change of the user equipment, it is possible to reduce the communication data amount between the relay node and the higher rank office, and to suppress a load of higher rank office.

Second Exemplary Embodiment

Next, a communication processing system according to a second exemplary embodiment of the present invention will be described. Here, processing of a location registration request message from a user equipment (hereinafter, UE) to a relay node (hereinafter, RN) in this exemplary embodiment is described. The RN is installed in a vehicle as a moving object and the processing is performed while RN is moving between tracking areas (hereinafter, TA). According to this exemplary embodiment, RN performs registration update of UE which transmitted a location registration request message within a prescribed period after TA movement of RN as UE which is a subordinate of RN. At the same time, RN gathers a plurality of location registration request messages within the prescribed period together in one location registration message. And, RN requests for location registration to a location registration node using this one location registration message. According to this exemplary embodiment, it is possible to reduce unnecessary location registration processing because RN responds quickly to a change of UE. Also, as RN transmits the location registration request signals by grouping into one location registration request message, it is possible to reduce the communication data amount between RN and the higher rank office, and moreover to suppress a load of higher rank office.

<<Configuration of Communication Processing System>>

FIG. 2A is a figure showing an outline of processing of a communication processing system 200 according to this exemplary embodiment.

In FIG. 2A, RN 230 is arranged in a train 250 which is moving. RN 230 moves between TAs together with UEs of subordinates in accordance with movement of the train 250. In FIG. 2A, RN 230 and UEs move from TA#1 to TA#n one by one. Each TA indicates a range which is controlled by each of a plurality of base stations (hereinafter referred to as eNB (Evolved-UTRAN NodeB)). Also, a location information management node (hereinafter referred to as MME (Mobility Management Entity)), which is a node connected to a plurality of eNBs and performs processing of management and authentication for location information, is arranged. Further, while FIG. 2A indicates that one MME corresponds to one TA, one MME may manage a plurality of TAs.

In FIG. 2A, UEs 211-215 are assumed. And, RN 230 and UEs move between TAs as a train 250 runs. A change of registration status of UE of a subordinate of RN 230 in this case is indicated by a UE identifier (UEID) of the subordinate.

First, in TA#1, cellular phones are registered as UEs 211, 212, 215 as they are subordinates of RN 230. When RN 230 and UEs have moved from TA#1 to TA#2, a location registration request message from UE 212 is not received at RN 230 due to power off or moving to out of range or the like. And, the location registration request message generated by power on or the internet access or the like is received at RN 230 from a notebook-sized personal computer (note PC) which is UE 214. As a result, in TA#2, UEs 211, 215, 214 are registered as UEs which are subordinates of RN 230.

Further, when RN 230 and UEs move to TA#n−1, location registration request messages from UE 211 and UE 215 are not received at RN 230 due to power off or moving to out of range. On the other hand, power of a smart phone which is UE 213 is turned on, and the location registration request message is received at RN 230. Accordingly, UEs 213, 214 are registered as UEs which are subordinates of RN 230. And, when RN 230 and UEs move to TA#n, UE 214 turns power off and UE 212 returns from out of range. As a result, UEs 213, 212 are registered based on the location registration request messages received at RN 230.

As described above, UE which RN 230 registers as a subordinate is updated dynamically for each TA movement in accordance with whether the location registration request message is transmitted to MME from UE or not (whether the location registration request message is received at RN 230 or not). Accordingly, the communication processing system 200 according to this exemplary embodiment can exclude unnecessary communication for services to UEs which are not currently existing as subordinates of RN 230 or UEs to which processing is not needed, and realizes effective utilization of communication resources and load reduction in MME.

FIG. 2B is a block diagram showing a configuration of the communication processing system 200 according to this exemplary embodiment. FIG. 2B is illustrating operation of the location registration processing when RN 230 and UEs 211, 212 move from TA#1 (220-1) to TA#2 (220-2).

By movement from TA#1 to TA#2, RN 230 and UEs 211, 212 transfer from a subordinate condition under eNB#1 (221) and MME#1 (241) to a subordinate condition under eNB#2 (222) and MME#1 (242). UEs 211 and 212, and UE 213 which has newly joined as a subordinate of RN#1 detect that TA has moved by a system notification information signal (refer to 3GPP (Third Generation Partnership Project) standard TS36.413) from eNB#2, and transmit the location registration request messages to new TA#2. RN#1 accumulates those location registration requests during a prescribed period, and performs the location registration request to MME#2 via eNB#2 in a lump after the prescribed time.

After starting the processing of location registration having been requested in a lump, MME#2 returns each UE a location registration information message which notifies completion of location registration for respective UEs in the order that the processing has been completed.

<<Operation Procedure of Communication Processing System>>

FIG. 3 is a sequence diagram showing an operation procedure 300 of the communication processing system 200 according to this exemplary embodiment. FIG. 3 indicates flows of data in the communication processing system 200 shown in FIG. 2B. This sequence diagram is a simplified figure which has been made based on chapter 5.3.3.1 "Tracking Area Update procedure with Serving GW change" of TS 23.401 which is the 3GPP standard with added features of RN 230 and this exemplary embodiment. In FIG. 3, similar to the case of FIG. 2B, it is supposed that RN#1 has moved from an area of MME#1/eNB#1 to an area of MME#2/eNB#2.

First, RN#1 starts a location registration timer (S301) when detecting that it has moved to new TA#2 based on the system notification information of eNB#2. And, RN#1 notifies UEs of its subordinates of the information on new TA#2 (TA information on MME#2). Each of UEs 211-213 of a subordinate of RN#1 receives the system information notified from RN#1, and transmits a location registration request signal to RN#1 when detecting new TA#2. For example, UE 213 transmits the location registration request signal (S303), UE 212 transmits the location registration request signal (S305) and UE 211 transmits the location registration request signal (S307).

There is no certain information for RN#1 of whether a plurality of UEs exist as subordinates. For this reason, RN#1 buffers the location registration request signal from UE while the location registration timer is operating. At the same time, RN#1 stores UEID of UE which is a transmission source of the location registration request signal as UEID of UE of the current subordinate existing under RN#1. When timeout of the timer of RN#1 (S309) occurs, RN#1 transmits the location registration request signals having been buffered from a plurality of UEs 211-213 as one location registration request message to MME#2 via eNB#2 (S311). In other words, RN#1 transmits the location registration signals from a plurality of subordinate UEs to MME#2 in a lump. As RN#1 transmits the location registration signals from a plurality of UEs to MME#2 in a lump, load reduction of MME#2 and stable location registration processing for UEs can be performed.

And, RN#1 registers UEIDs having been stored as information which indicates the subordinate UEs of RN#1 (S313). And, RN#1 uses UEIDs registered in Step S313 as information which indicates the subordinate UEs until moving to the next TA.

MME#2, which has received the location registration request message, which is the location registration request signals from UEs being collected, via eNB#2 from RN#1 requests the UE status (Context) for the respective UEs from MME#1 or other MME. In FIG. 3, MME#2 requests Context of UE 213 from other MME (S315). In Steps S317 and S319, MME#2 requests Context of UE212 and UE211 from MME#1 respectively.

When having received a Context response of each UE, and completed location registration processing, MME#2 transmits a location registration request accepted signal by a location registration information message to each subordinate UE of RN#1 individually in the order of completion. For example, when having received a Context response from UE 212 and completed the location registration processing of MME#2, MME#2 transmits the location registration information message with a destination address of UE 212 via eNB#2 and RN #1 (S323). Next, when having received a Context response from UE 213 and completed the location registration processing of MME#2 (S325), MME#2 transmits the location registration information message with a destination address of UE 213 via eNB#2 and RN #1 (S327). Finally, when having received a Context response from UE 211 and completed the location registration processing of MME#2 (S329), MME#2 transmits the location registration information message with a destination address of UE 211 via eNB#2 and RN #1 (S331).

The reason why the location registration request accepted signal is transmitted to each UE individually is for completing the location registration processing procedure early to some extent. That is, this is because it completes the location registration processing earlier for each UE that MME#2 transmits the location registration request accepted signal at the time of processing completion to individual UE, rather than MME#2 to transmit the location registration request accepted signals in a lump after waiting for processing completion to a plurality of UEs. Also, this is because MME#2 can control so as not to congest (overflow) a transmission buffer by itself because MME#2 is a transmitting side of the location registration request accepted signal.

<<Format of Transmission and Reception Messages>>

The following messages which are already specified in TS36.413 of the 3GPP standard are used as the location registration request message from RN#1 to MME#2 and the location registration information message from MME#2 to each UE in FIG. 3. That is, as messages, they are an UPLINK NAS TRANSPORT message and a DOWNLINK NAS TRANSPORT message used by the NAS (Non Access Stratum) protocol between MME and UE. The format of the respective messages in this exemplary embodiment is indicated below.

Further, the message used as the location registration request message or the location registration information message is not limited to a message of the NAS protocol. For example:
- an Initial UE message;
- an S1 SETUP REQUEST message;
- an ENB CONFIGURATION UPDATE message; or
- a UE CAPABILITY INFO INDICATION message;

can be used.

(Location Registration Request Message)

FIG. 4 is a figure showing a composition of the location registration request message 400 of an uplink according to this exemplary embodiment.

FIG. 4 indicates a message in which the list (NAS-PDUList) 401 of NAS-PDU (Protocol Data Unit) is further added to the UPLINK NAS TRANSPORT message which is already specified in TS36.413 of the 3GPP standard. The list 402 indicates a definition of the value "maxnoofNAS-PDUs" of "Range" in the list 401 of NAS-PDU.

(Location Registration Information Message)

FIG. 5 is a figure showing a composition of the location registration information message 500 of a downlink according to this exemplary embodiment.

The DOWNLINK NAS TRANSPORT message which is already specified in TS36.413 of the 3GPP standard can be used as the location registration information message 500 transmitted to each UE individually.

<<Configuration of RN>>

Next, a configuration of RN of this exemplary embodiment will be described.

(Functional Structure)

FIG. 6 is a block diagram showing functional structure of RN 230 according to this exemplary embodiment.

In FIG. 6, a communication control unit 601 controls communication with eNB and UE. First, a TAI extraction unit 602 extracts TAI (Tracking Area Identity) from the system notification information received at the communication control unit 601 from eNB. The extracted TAI is compared with former TAI stored in a TAI memory unit 603 at a TA move judgment unit 604, and it is judged whether RN 230 has moved between TAs. A timer 605 starts time measurement when the TA move judgment unit 604 judges the movement of RN 230 between TAs.

On the other hand, a location registration request signal extraction unit 606 extracts a location registration request signal to MME from UE having moved between TAs which the communication control unit 601 received from UE. And, the location registration request signal extraction unit 606 sends UEID which identifies a transmission source UE of the location registration request signal to a UE registration unit 607, also correlates UEID and the location registration request signal and sends it to a location registration request signal buffer 608. The UE registration unit 607 stores the transmission source UE of the location registration request signal successively, and the location registration request signal buffer 608 performs buffering by correlating UEID and the location registration request signal. This processing is continued until timeout of the timer 605 is occurred.

When the timer 605 has measured a prescribed time and timeout has occurred, memorization of UEID at the UE registration unit 607 and buffering of UEID and the location registration request signal at the location registration request signal buffer 608 are stopped. And, in order to transmit the location registration request signals having been buffered in the location registration request signal buffer 608 in a lump, a location registration request message generating unit 609 generates one location registration request message like shown in FIG. 4. A location registration request message transmission unit 610 transmits the location registration request message, which the location registration request message generating unit 609 has generated, for transmitting the location registration request signals having been buffered in a lump.

A location registration information message relay unit 611 transmits the location registration request accepted signal to UE of a designated destination based on an individual location registration information message for each UE received from MME via eNB.

(Hardware Configuration)

FIG. 7 is a block diagram showing a hardware configuration of RN 230 in this exemplary embodiment.

In FIG. 7, CPU 710 is a Central Processing Unit for computation control, and the function of RN 230 of FIG. 3 is realized by executing a program. ROM 720 is a Read Only Memory storing fixed data, which is initial data and a program or the like, and the program. The communication control unit 601 communicates with UE or eNB.

RAM 740 is a random access memory which CPU 710 uses as a work area for temporary storage. In RAM 740, an area in which necessary data for realizing this exemplary embodiment is memorized has been reserved. A received message 741 is a message received from UE or eNB via the communication control unit 601. TAI 742 is TAI extracted from the system notification information which is a received message received from eNB. A TA move flag 743 is a flag which is set when TA movement is judged based on comparison of the extracted TAI 742 and TAI in the TAI memory unit 603.

The timer 605 is a timer which sets a receiving period of the location registration request signal from UE. The location registration request signal buffer 608 is a buffer which memorizes the location registration request signals having been received. A location registration request message 744 for transmission is a message which is generated by gathering the location registration request signals in the location registration request signal buffer 608. A location registration information message 745 is a message of location registration information received from MME via eNB. A location registration request accepted signal 746 is a location registration request accepted signal transmitted to UE based on the location registration information message.

In storage 750, a database and various parameters, or the following data and programs which are required for realizing this exemplary embodiment are stored. The TAI memory unit 603 stores TAI, and the UE registration unit 607 stores information on a transmission source UE of a location registration request signal. Further, a communication processing program 751, a UE registration module 752 and a location registration request control module 753 are stored in the storage 750. The communication processing program 751 is a program which makes overall processing execute. The UE registration module 752 is a module which registers a subordinate UE of RN in the communication processing program 751. The location registration request control module 753 is a module which controls the location registration request in the communication processing program 751.

Further, in FIG. 7, only data and programs indispensable to this exemplary embodiment are shown, and general-purpose data and programs such as OS are not illustrated.

<<Processing Procedure of RN>>

FIG. 8 is a flowchart showing a processing procedure of RN 230 in this exemplary embodiment. This flowchart shows that the function of each unit of RN 230 of FIG. 6 is realized by CPU 710 of FIG. 7 which executes the communication processing program 751 while using RAM 740.

RN 230, first, judges whether TA movement has occurred or not (S811). Also, RN 230 judges whether a location registration request signal from UE has been received or not (S821). Further, RN 230 judges whether a location registration information message from MME via eNB has been received or not (S841).

When judged that TA movement has occurred, the timer 605 starts (S813).

When judged that the location registration request signal from UE has been received, RN 230 judges whether timeout of the timer 605 has occurred or not (S823). When timeout of the timer 605 has not yet occurred, RN 230 stores UEID of UE (S825). Next, RN 230 correlates the location registration request signal from UE to UEID and performs buffering. When timeout of the timer 605 has occurred, RN 230 registers UEs of UEIDs which have been stored until timeout has occurred and holds as subordinates of RN 230 (S829). Next, RN 230 generates one location registration request message based on the location registration request signals being buffered (S831). And, RN 230 transmits one location registration request message to MME via eNB (S833).

When the location registration information message from MME via eNB is received, RN 230 transmits the location registration request accepted signal to the designated individual UE (S843).

<<Configuration of Location Information Management Node>>

Next, a configuration of the location information management node (MME) of this exemplary embodiment will be described.

(Functional Structure)

Figure 9:
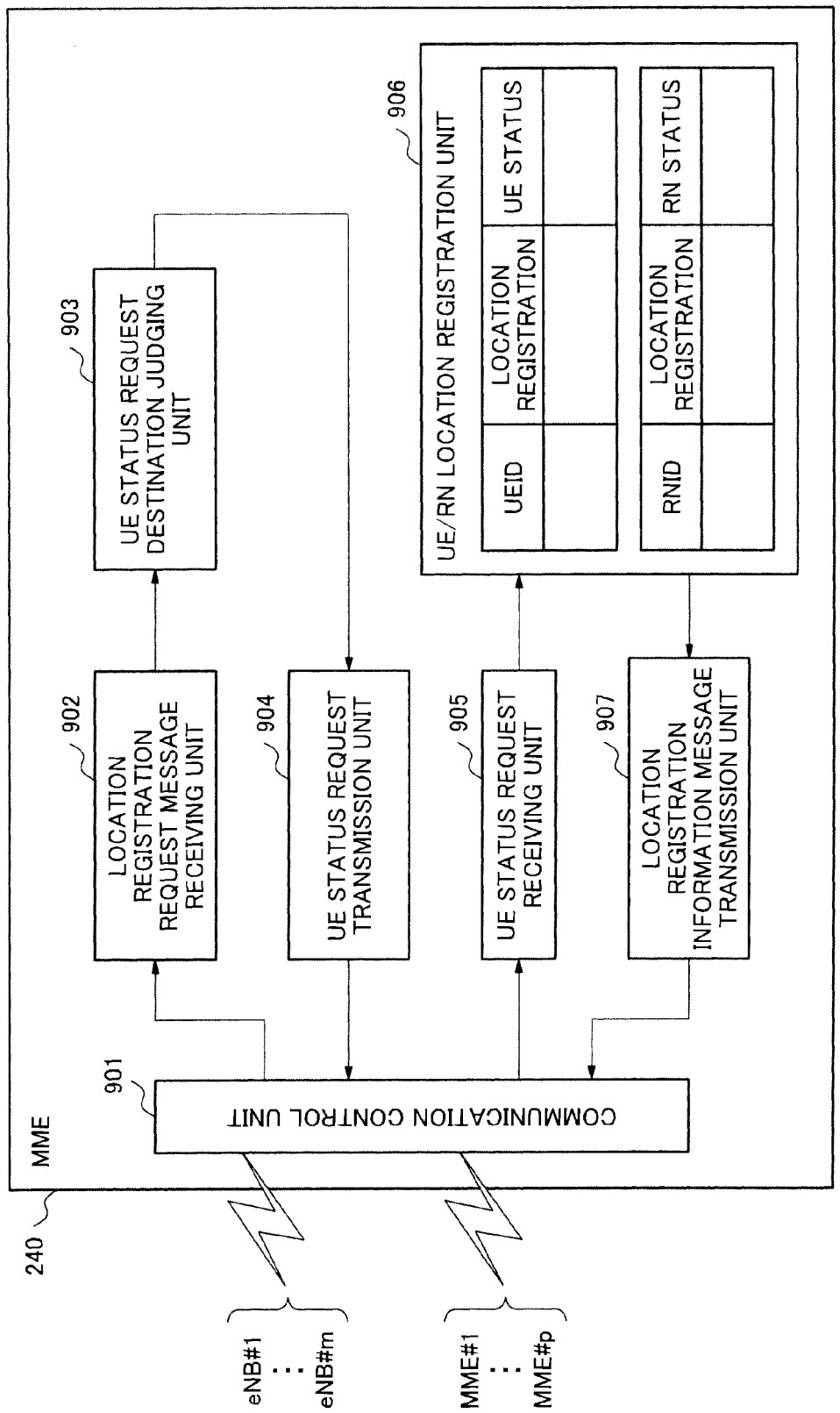
FIG. 9 is a block diagram showing functional structure of a location information management node according to the second exemplary embodiment of the present invention.

FIG. 9 is a block diagram showing functional structure of the location registration node (MME) 240 according to this exemplary embodiment.

In FIG. 9, a communication control unit 901 controls communication with eNB and other MME. First, a location registration request message receiving unit 902 receives one location registration request message transmitted via eNB from RN through the communication control unit 901. In this one location registration request message, the location registration request signals from a plurality of UEs during the prescribed period are gathered and included. A UE status request destination judging unit 903 judges MME to which the location was registered in a previous time for each UE as a request destination of the UE status (Context). And, MME 240 transmits a UE status request message from a UE status request transmission unit 904 to each of MMEs.

A UE status receiving unit 905 correlates the UE status, which is included in a response from the requested MME, to UEID and registers in a UE/RN location registration unit 906. Further, in case of a configuration in which current MME covers a plurality of TAs, the UE status in the UE/RN location registration unit 906 is continuously used just as it is. Further, although it is not explained in detail in this exemplary embodiment, the location of RN is also correlated to RNID and registered in the UE/RN location registration unit 906 (refer to third exemplary embodiment).

When the location registration and the UE status registration in the UE/RN location registration unit 906 are completed, a location registration information message transmission unit 907 generates and transmits a location registration information message which becomes a location registration request accepted signal to UE based on UEID to the completed each UE individually via eNB and RN.

(Hardware Configuration)

Figure 10:
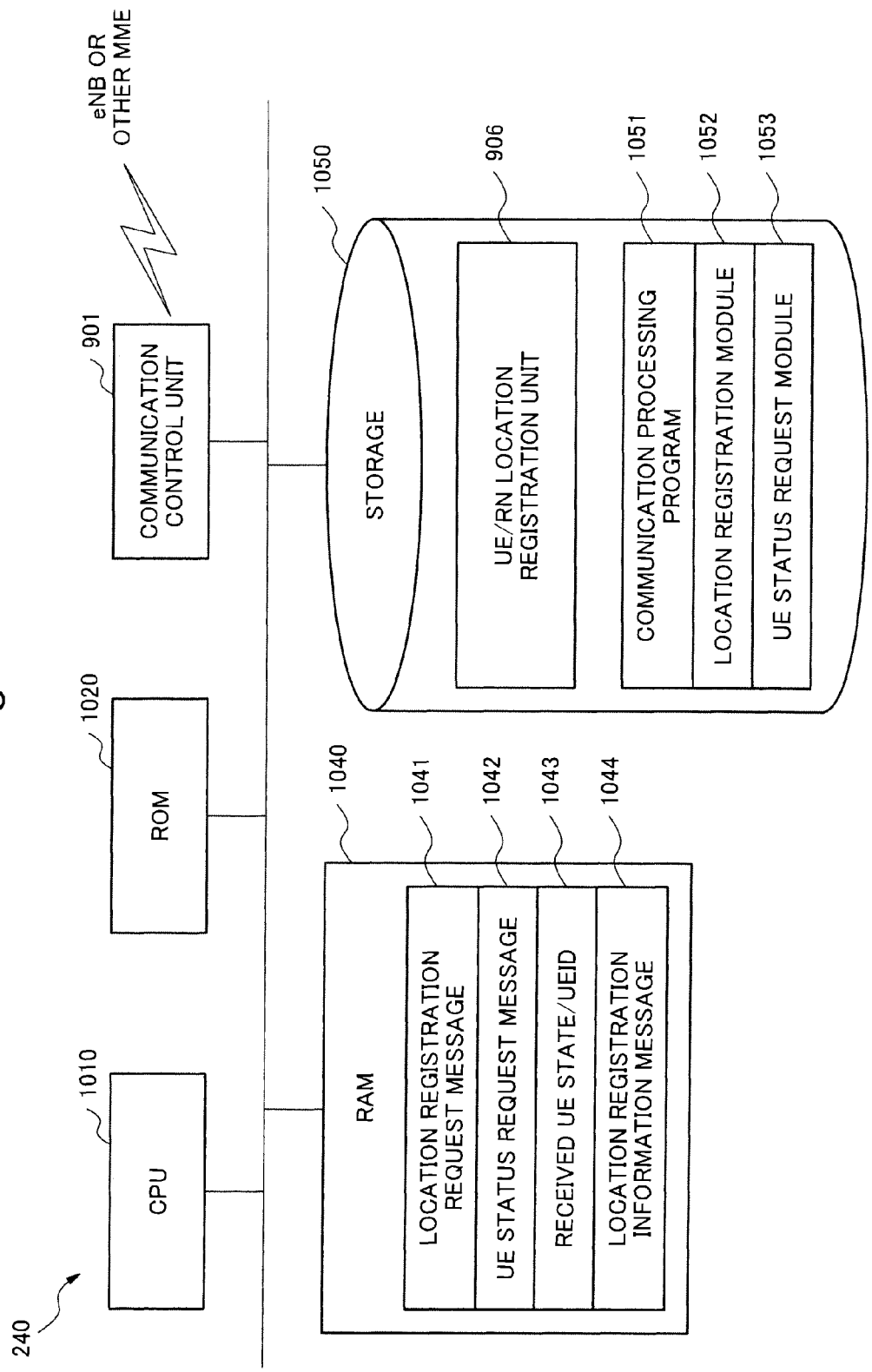
FIG. 10 is a block diagram showing a hardware configuration of the location information management node according to the second exemplary embodiment of the present invention.

FIG. 10 is a block diagram showing a hardware configuration of the location information management node (MME) 240 according to this exemplary embodiment.

In FIG. 10, CPU 1010 is a processor for computation control, and each function of MME 240 of FIG. 9 is realized by executing a program. ROM 1020 is a Read Only Memory storing fixed data, which is initial data and a program or the like, and the program. The communication control unit 901 communicates with other MME or eNB.

RAM 1040 is a random access memory which CPU 1010 uses as a work area of temporary storage. In RAM 1040, an area in which necessary data for realizing this exemplary embodiment is memorized has been reserved. A location registration request message 1041 is a message which includes the location registration request signals from a plurality of UEs received from RN via eNB through the communication control unit 901. A UE status request message 1042 is a message for requesting the UE status (Context) of each UE from other MME. The received UE status 1043 is the status of each UE correlated to UEID which is a response from other MME. A location registration information message 1044 is a message transmitted to each UE individually via eNB and RN.

In storage 1050, a database and various parameters, or the following data and programs which are required for realizing this exemplary embodiment are stored. The UE/RN location registration unit 906 stores location registration information on UE and RN. The following programs are stored in the storage 1050. A communication processing program 1051 is a program which makes overall processing of MME execute. A location registration module 1052 is a module which controls location registration of UE and RN in the communication processing program 1051. A UE status request module 1053 is a module for requesting the UE status from other MME in the communication processing program 1051.

Further, only data and programs indispensable to this exemplary embodiment are shown in FIG. 10, and general-purpose data and programs such as OS are not illustrated.

<<Processing Procedure of Location Registration Node>>

Figure 11:
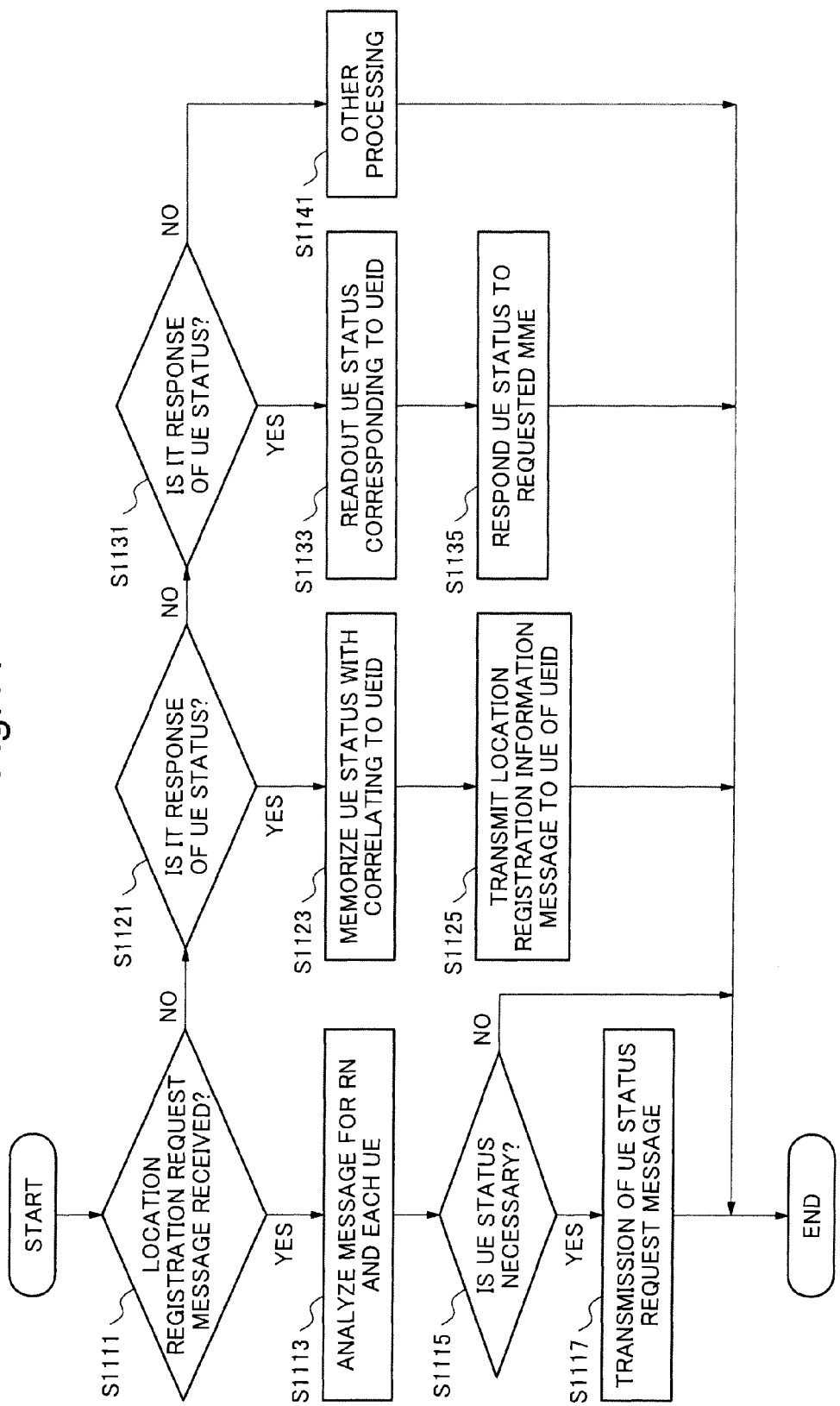
FIG. 11 is a flowchart showing a processing procedure of the location information management node according to the second exemplary embodiment of the present invention.

FIG. 11 is a flowchart showing a processing procedure of the location registration node (MME) 240 according to this exemplary embodiment. This flowchart shows that the function of each unit of FIG. 9 is realized by CPU 1010 of FIG. 10 which executes the communication processing program 1051 while using RAM 1040.

MME 240, first, judges whether the location registration request message has been received from RN via eNB or not (S1111). Also, MME 240 judges whether the received message is reception of the UE status from other MME which is a response to the UE status request or not (S1121). Further, MME 240 judges whether the received message is reception of the UE status request from other MME or not (S1131).

When the received message is reception of the location registration request message from RN, MME 240 analyzes the message for RN and for each of the plurality of UEs based on the location registration request message (S1113). And, MME 240 judges whether it should request the UE status from other MME or not (S1115). When it is not necessary to request the UE status, processing is ended. When it needs to request the UE status, MME 240 transmits the UE status request message to the corresponding MME (S1117).

When the received message is the UE status response from other MME, MME 240 correlates the received UE status to UEID and stores in the UE/RN location registration unit 906 (S1123). Then, MME 240 generates the location registration information message, and transmits the completion of location registration to UE shown by UEID via eNB and RN to each UE individually (S1125).

When the received message is the UE status request from other MME, MME 240 reads out the UE status corresponding to UEID (S1133). And, MME 240 transmits the UE status to other MME which has requested (S1135). When the received message is not any one of the above mentioned received messages, MME 240 carries out other processing of MME corresponding to the message, for example, authentication processing or the like.

Third Exemplary Embodiment

Next, a communication processing system according to a third exemplary embodiment of the present invention will be described. The communication processing system according to this exemplary embodiment performs registration update for UE which has transmitted a location registration request message within a prescribed period after TA movement of RN as UE which is a subordinate of RN. Further, in the communication processing system according to this exemplary embodiment, unlike the second exemplary embodiment, the location registration request signals received from UE in a prescribed period are not transmitted to MME in a lump. In the communication processing system according to this exemplary embodiment, when RN detects movement between TAs, RN transmits a location registration request message of RN including UEIDs of all UEs currently being registered as its subordinates. According to this exemplary embodiment, as RN can respond quickly to a change of UE, unnecessary location registration processing can be reduced. Also, as UEIDs of all UEs currently being registered as its subordinates are transmitted in a lump, it is possible to reduce the communication data amount and further to suppress a load of higher rank office.

Further, because the configuration of the communication processing system is similar to FIG. 2B, the explanation is omitted to avoid overlapping, and the operation procedure will be explained below.

<<Operation Procedure of Communication Processing System>>

Figure 12:
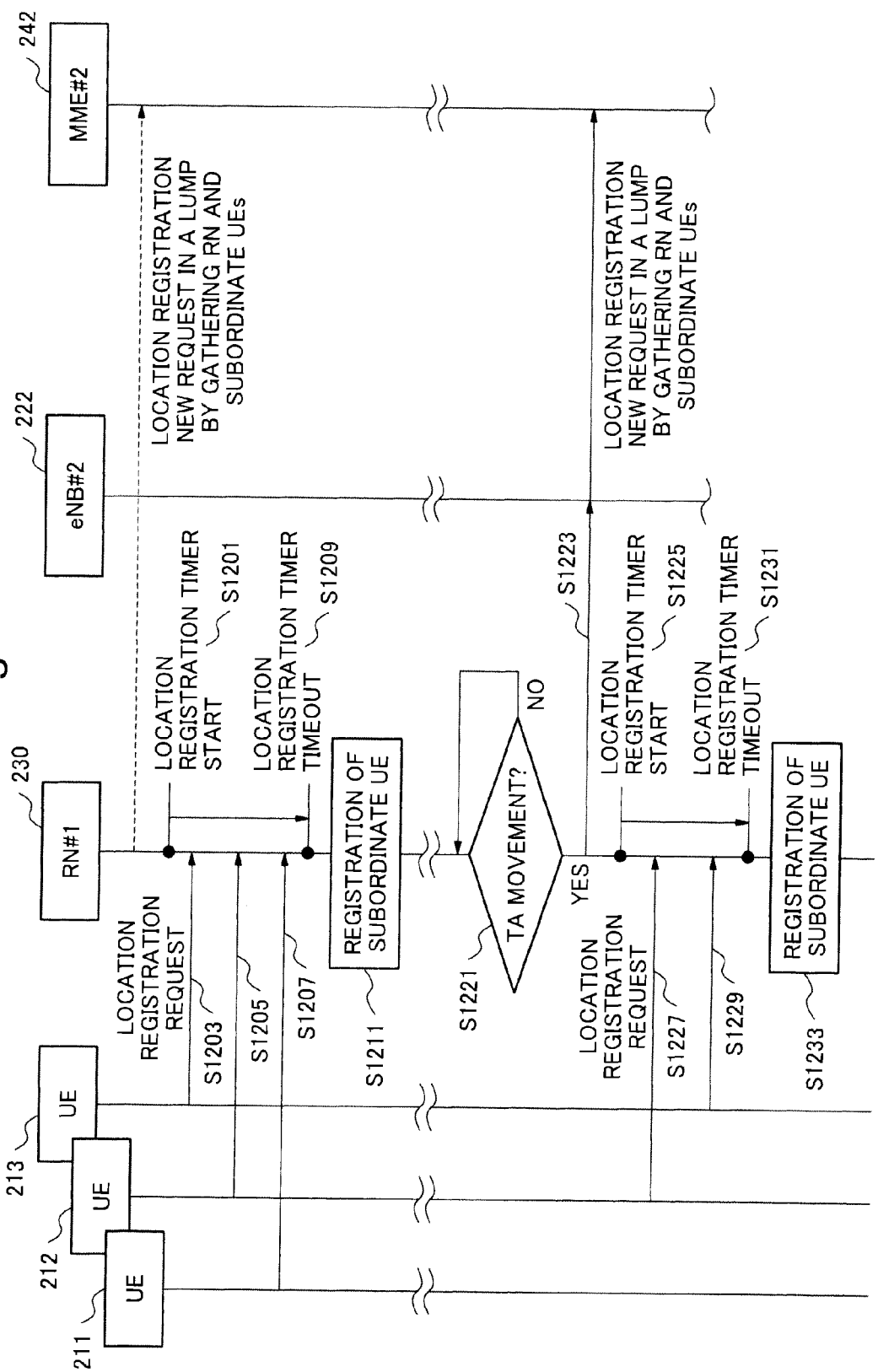
FIG. 12 is a sequence diagram showing an operation procedure of a communication processing system according to a third exemplary embodiment of the present invention.

FIG. 12 is a sequence diagram showing an operation procedure 1200 of the communication processing system according to this exemplary embodiment. In FIG. 12, it is supposed that RN#1 has moved from an area of MME#1/eNB#1 to an area of MME#2/eNB#2 similar to the case of FIG. 3.

First, RN#1 starts a location registration timer when it detects that it has moved to new TA#2 based on the system notification information of eNB#2 (S1201). And, RN#1 notifies UEs of its subordinates of the information of new TA#2 (TA information of MME#2). Each of UEs 211-213 of subordinates of RN#1 receives the system information notified from RN#1, and transmits a location registration request signal to RN#1 when detecting new TA#2. For example, UE 213 transmits the location registration request signal in Step S1203, and UE 212 transmits the location registration request signal in Step S1205, and UE 211 transmits the location registration request signal in Step S1207.

With respect to the transmission source UEs 211-213 which have transmitted the location registration request signals during operation of the location registration timer, RN#1 stores as UEs of subordinates of RN#1 currently existing. When timeout has occurred in the timer of RN#1 (S1209), RN#1 registers UEIDs which have been stored up to the timeout as information indicating UEs of subordinates of RN#1 (S1211). And, RN#1 uses UEIDs registered in Step S1211 as information which indicates UEs of its subordinates until the next TA movement.

After that, when RN#1 detects movement between TAs again (S1221), RN#1 transmits the location registration request message of RN#1 including UEIDs of UEs 211-213, which are being registered as currently existing subordinates of RN#1, to MME#2 via eNB#2 (S1223). Here, because the location registration request message which RN#1 transmits is similar to FIG. 4, the explanation here is omitted.

When RN#1 detects movement between TAs (S1221), at the same time, the location registration timer starts (S1225). And, RN#1 registers the location registration request signals which have been received from UEs until timeout of the location registration timer in Step S1231, as UEs of next subordinates (S1233). In FIG. 12, RN#1 is receiving the location registration request signals from UE 212 and UE 213 (S1227 and S1229). Accordingly, they are UEs 212 and 213 which are registered in Step S1233 as existing subordinates. With respect to UE211, it is not registered as a subordinate of RN#1 because it did not transmit a location registration request signal due to power off or moving to out of range, or RN#1 failed to receive the location registration request signal.

Further, the explanation of the location registration of MME#2 and the answer flow of the location registration request accepted signal to UE after transmitting the location registration request message of RN#1 (S1223) including UEIDs of UEs 211-213, which are being registered as currently existing subordinates of RN#1, is omitted because it is similar to FIG. 3.

<<Processing Procedure of RN>>

Figure 13:
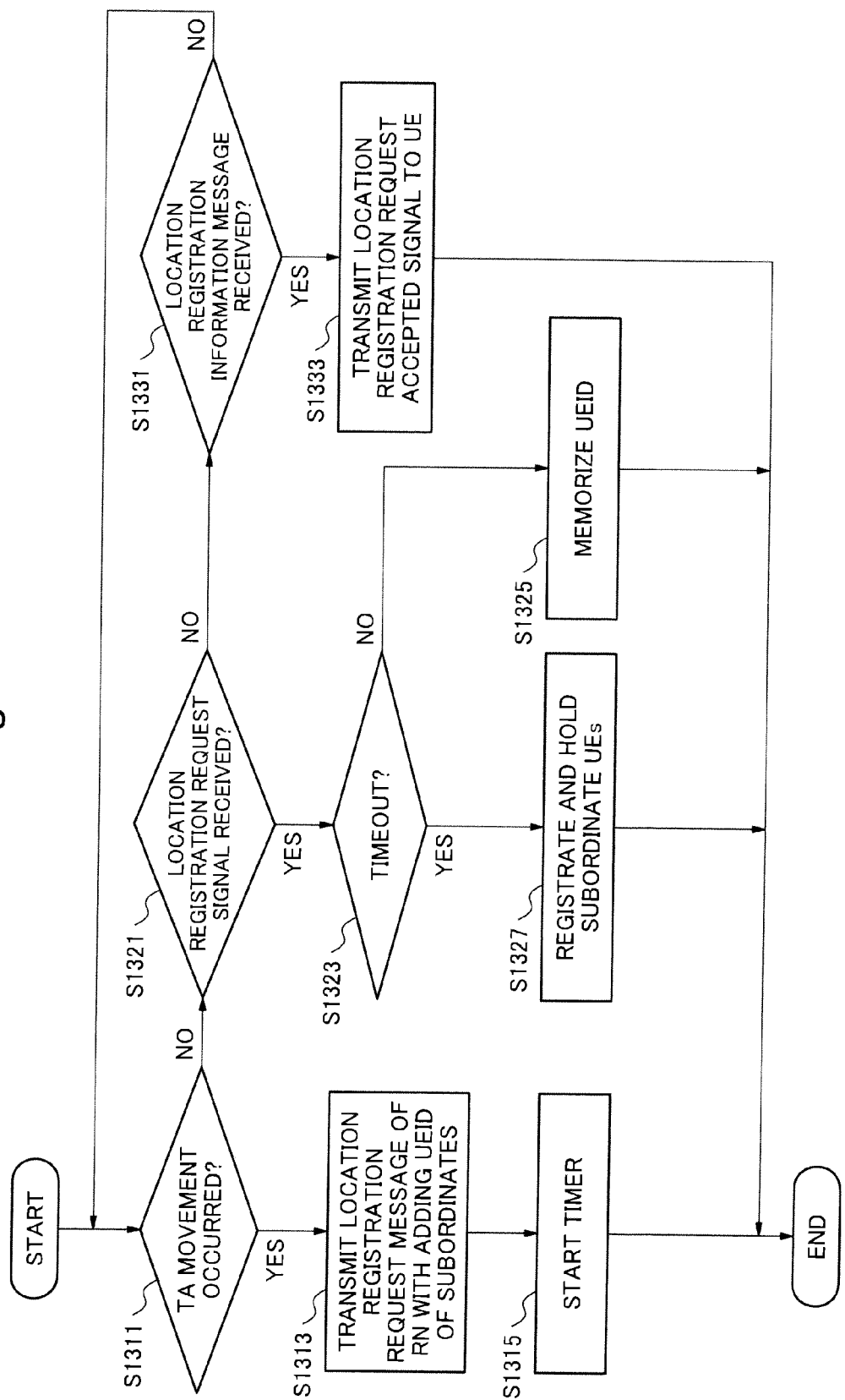
FIG. 13 is a flowchart showing a processing procedure of a relay node according to the third exemplary embodiment of the present invention.

FIG. 13 is a flowchart showing a processing procedure of RN according to this exemplary embodiment. Further, as the configuration of RN is similar to FIG. 6 and FIG. 7 of the second exemplary embodiment, detailed explanation is omitted. This flowchart realizes the function of each unit of RN by CPU 710 of FIG. 7 which executes similar to FIG. 8 while using RAM 740.

First, RN judges whether TA has moved or not (S1311). Also, RN judges whether the location registration request signal from UE has been received or not (S1321). Further, RN judges whether the location registration information message from MME via eNB has been received or not (S1331).

When judged that TA has moved in Step S1311, RN transmits a location registration request message with adding UEIDs which are being registered as its subordinates to MME via eNB (S1313). Next, the timer 605 starts (S1315).

When judged that the location registration request signal has been received from UE (S1323), RN judges whether timeout of the timer 605 has occurred or not. When timeout of the timer 605 has not occurred yet, RN stores UEID (S1325). When timeout of the timer 605 has occurred, RN registers UEs of UEIDs stored until timeout has occurred and holds as subordinates of RN (S1327).

When a received message is the location registration information message from MME via eNB, RN transmits a location registration request accepted signal to the designated individual UE (S1333).

Further, in this exemplary embodiment, UEIDs of subordinates to be transmitted in a lump are set based on the location registration request signals from UEs at the time of movement between TAs. However, because RN also has UEID as IMSI (International Mobile Subscriber Identity) or S-TMSI (SAE Temporary Mobile Subscriber Identity), these IDs may be used.

Fourth Exemplary Embodiment

Next, a communication processing system according to a fourth exemplary embodiment of the present invention will be described. The communication processing system according to this exemplary embodiment, unlike the second exemplary embodiment, does not transmit a location registration accepted signal from MME to each UE in the order of completion of the location registration. The communication processing system according to this exemplary embodiment notifies RN of the status of each of UEs by one location registration information message in a lump at the time when the location registration for all UEs has been completed. Then, RN transmits the location registration accepted signal to each UE. According to this exemplary embodiment, similar to the second exemplary embodiment and the third exemplary embodiment, because RN can respond quickly to a change of UE, unnecessary location registration processing can be reduced. Also, because RN transmits the location registration requests of UEs to MME in a lump, it is possible to reduce the communication data amount, and further to suppress a load of higher rank office. Moreover, because MME also transmits the location registration accepted signals to RN in a lump, it can further reduce the communication data amount.

Further, because the configuration of the communication processing system is similar to FIG. 2B, its explanation is omitted and the operation procedure will be explained below.

<<Operation Procedure of Communication Processing System>>

FIG. 14 is a sequence diagram showing an operation procedure of the communication processing system according to this exemplary embodiment. Further, because Steps S301 to S319 of FIG. 14 are the same procedure as FIG. 3 of the second exemplary embodiment, the explanation is omitted.

In FIG. 14, the UE status for respective UEs is responded from MME#1 or other MME (S1421, S1423 and S1425). In the communication processing system according to this exemplary embodiment, MME#2 does not transmit the location registration information message for the location registration accepted signal on each occasion, but performs buffering. And, when having completed the location registration of all UEs, MME#2 generates one location registration information message which includes the location registration accepted signals to all UEs and transmits to RN#1 via eNB#2 (S1427). RN#1 sends the location registration accepted signals to all UEs of subordinates based on the received one location registration information message (S1429, S1431 and S1433).

<<Location Information Message>>

FIG. 15 is a figure showing a composition of a location registration information message 1500 of a downlink according to this exemplary embodiment.

The location registration information message 1500 is a message in which the list (NAS-PDUList) 1501 of NAS-PDU is further added to the DOWNLINK NAS TRANSPORT message specified in TS36.413 of the 3GPP standard. The list 1502 is a definition of the value "maxnoofNAS-PDUs" of "Range" in the list 1501 of NAS-PDU.

Other Exemplary Embodiment

Further, in each of exemplary embodiments mentioned above, the movement between TAs of RN which is arranged in a moving object such as a train is explained as an example. However, the present invention may be applied to a case where RN is arranged at a location which is not covered only by eNB or a case where RN is used temporarily in a room of building or at a booth of event venue or the like. Also, it has been explained by use of messages of the NAS protocol in the above exemplary embodiments, however, it is possible to realize the same function as each exemplary embodiment by using any of an Initial UE Message, an S1 SETUP REQUEST message, an ENB CONFIGURATION UPDATE message and a UE CAPABILITY INFO INDICATION message.

While this invention has been explained in detail about the exemplary embodiments as above, a system or an apparatus which combined the separate features included in the respective exemplary embodiments in any way is also included in the category of the present invention.

Also, the configuration of each exemplary embodiment may be applied to a system including a plurality of equipments, or it may be applied to a single apparatus. Further, the configuration of each exemplary embodiment is applicable to a case where a control program which realizes the function of the exemplary embodiment is supplied to a system or an apparatus directly or from remote. Accordingly, a control program which is installed in a computer for realizing the function of each exemplary embodiment by the computer or a medium storing the control program, and a WWW (World Wide Web) server which makes the control program download are also included in the category of the configuration of each exemplary embodiment.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

Other Expression of Exemplary Embodiment

The whole or part of the exemplary embodiments disclosed above can be described as, but not limited to, the following supplementary notes.

(Supplementary Note 1)

A communication processing system comprising a user equipment, a base station and a relay node for relaying the user equipment and the base station,
wherein the relay node comprises:
a timer means which measures a prescribed time after detecting movement between tracking areas; and
a user equipment registration means which registers the user equipment, which is a transmission source of a location registration request signal to a location information management means, which manages location information, received by the relay node during the prescribed period, as a subordinate of the relay node.

(Supplementary Note 2)

The communication processing system according to supplementary note 1, wherein the relay node further comprises:
a buffer means which buffers the location registration request signal of the user equipment transmitted from each user equipment after the relay node has moved between the tracking areas; and
a location registration request message transmission means which gathers the location registration request signals of a plurality of user equipments which the buffer means has buffered during the prescribed period together in one location registration request message, and transmits it to the location information management means.

(Supplementary Note 3)

The communication processing system according to supplementary note 1, wherein the relay node further comprises:

a message generating means which generates a location registration request message of the relay node including an identifier which identifies each user equipment registered as the subordinate of the relay node; and a location registration request message transmission means which transmits the location registration request message of the relay node, which is generated by the message generating means after the relay node has moved between the tracking areas and includes the identifier of the user equipment, to the location information management means.

(Supplementary Note 4)

The communication processing system according to any one of supplementary notes 1 to 3, wherein the location information management means comprises, a location registration information message transmission means which responds to the location registration request message from the relay node, and transmits a location registration information message to each of the user equipments in the order of completion of location registration processing for each user equipment.

(Supplementary Note 5)

The communication processing system according to supplementary note 4, wherein the location registration processing of the location information management means includes processing which transmits information on the user equipment to this location information management means from the location information management means in which location registration of the user equipment used to be registered before movement of the tracking area.

(Supplementary Note 6)

The communication processing system according to supplementary note 4 or 5, wherein a DOWNLINK_NAS_TRANSPORT message specified in TS36.413 of 3GPP is used as the location registration information message from the location information management means to the user equipment.

(Supplementary Note 7)

The communication processing system according to any one of supplementary notes 1 to 6, wherein an UPLINK_NAS_TRANSPORT message specified in TS36.413 of 3GPP is used as the location registration request message from the relay node to the location information management means.

(Supplementary Note 8)

The communication processing system according to any one of supplementary notes 1 to 7, wherein any of an Initial UE message, an S1 SETUP REQUEST message, an ENB CONFIGURATION UPDATE message and a UE CAPABILITY INFO INDICATION message is used as the location registration information message from the location information management means to the user equipment or the location registration request message from the relay node to the location information management means.

(Supplementary Note 9)

A location registration method in a communication processing system comprising a user equipment, a base station and a relay node for relaying the user equipment and the base station, the method comprising the steps of:

measuring a prescribed time by the relay node from detecting movement between tracking areas;

registering, by the relay node, the user equipment, which is a transmission source of a location registration request signal to a location information management means, which manages location information, received by the relay node during the prescribed period, as a subordinate of the relay node; and transmitting, by the relay node, a plurality of location registration request signals received from the user equipments during the prescribed period to the location information management means by one location registration request message.

(Supplementary Note 10)

A relay node for relaying a user equipment and a base station, comprising:

a timer means which measures a prescribed time from detecting that the relay node has moved between tracking areas; and a user equipment registration means which registers the user equipment, which is a transmission source of a location registration request signal to a location information management means, which manages location information, received by the relay node during the prescribed period, as a subordinate of the relay node.

(Supplementary Note 11)

A control method of a relay node for relaying a user equipment and a base station, comprising the steps of measuring a prescribed time from detecting that the relay node has moved between tracking areas; and registering the user equipment, which is a transmission source of a location registration request signal to a location information management means, which manages location information, received by the relay node during the prescribed period, as a subordinate of the relay node.

(Supplementary Note 12)

A tangible and non-transitory computer readable recording medium having embodied thereon a control program of a relay node for relaying a user equipment and a base station, which makes a computer execute the following proceedings of:

measuring a prescribed time from detecting that the relay node has moved between tracking areas; and registering the user equipment, which is a transmission source of a location registration request signal to a location information management means, which manages location information, received by the relay node during the prescribed period, as a subordinate of the relay node.

(Supplementary Note 13)

A location information management apparatus which manages movement of a user equipment between tracking areas comprising:

a receiving means which receives location registration requests, corresponding to movement of a plurality of user equipments between the tracking areas, from the plurality of user equipments as one location registration request message;

a location registration means which executes the location registration for the plurality of user equipments; and a transmission means which transmits a location registration information message indicating completion of the location registration to each of the user equipments in the order of completion of the location registration for each user equipment.

(Supplementary Note 14)

A control method of a location information management apparatus which manages movement of a user equipment between tracking areas comprising the steps of:

receiving location registration requests, corresponding to movement of a plurality of user equipments between the tracking areas, from the plurality of user equipments by one location registration request message;

executing the location registration for the plurality of user equipments; and transmitting a location registration information message indicating completion of the location registration to each of the user equipments in the order of completion of the location registration for each user equipment.

(Supplementary Note 15)

A tangible and non-transitory computer readable recording medium having embodied thereon a control program of a location information management apparatus which manages movement of a user equipment between tracking areas, which makes a computer execute the following proceedings of:

receiving location registration requests, corresponding to movement of a plurality of user equipments between the tracking areas, from the plurality of user equipments by one location registration request message;

executing the location registration for the plurality of user equipments; and transmitting a location registration information message indicating completion of the location registration to each of the user equipments in the order of completion of the location registration for each user equipment.

The invention claimed is:

1. A communication processing system comprising a user equipment, a base station, and a relay node for relaying the user equipment and the base station, wherein the relay node comprises:

a timer unit which measures a prescribed time after detecting movement between tracking areas;

a user equipment registration unit which registers the user equipment, which is a transmission source of a location registration request signal to a location information management unit, which manages location information, received by the relay node during the prescribed time, as a subordinate of the relay node;

a buffer unit which buffers the location registration request signal of the user equipment transmitted from each user equipment after the relay node has moved between the tracking areas; and a location registration request message transmission unit which gathers the location registration request signals of a plurality of user equipments which the buffer unit has buffered during the prescribed time together in one location registration request message, and transmits the one location registration request message to the location information management unit.

2. The communication processing system according to claim 1, wherein the relay node further comprises:

a message generating unit which generates a location registration request message of the relay node including an identifier which identifies each user equipment registered as the subordinate of the relay node, wherein the location registration request message transmission unit transmits the location registration request message of the relay node, which is generated by the message generating unit after the relay node has moved between the tracking areas and includes the identifier of the user equipment, to the location information management unit.

3. The communication processing system according to claim 1, wherein the location information management unit comprises, a location registration information message transmission unit which responds to the location registration request message from the relay node, and transmits a location registration information message to each of the user equipments in the order of completion of location registration processing for each user equipment.

4. The communication processing system according to claim 3, wherein the location registration processing of the location information management unit includes processing which transmits information on the user equipment to this location information management unit from the location information management unit in which location registration of the user equipment used to be registered before movement of the tracking area.

5. The communication processing system according to claim 3, wherein a DOWNLINK_NAS_TRANSPORT message specified in TS36.413 of 3GPP is used as the location registration information message from the location information management unit to the user equipment.

6. The communication processing system according to claim 1, wherein an UPLINK_NAS_TRANSPORT message specified in TS36.413 of 3GPP is used as the location registration request message from the relay node to the location information management unit.

7. The communication processing system according to claim 1, wherein any of an Initial UE message, an S1 SETUP REQUEST message, an ENB CONFIGURATION UPDATE message and a UE CAPABILITY INFO INDICATION message is used as the location registration information message from the location information management unit to the user equipment or the location registration request message from the relay node to the location information management unit.

8. A location registration method in a communication processing system comprising a user equipment, a base station, and a relay node for relaying the user equipment and the base station, the method comprising:

measuring a prescribed time by the relay node from detecting movement between tracking areas;

registering, by the relay node, the user equipment, which is a transmission source of a location registration request signal to a location information management unit, which manages location information, received by the relay node during the prescribed time, as a subordinate of the relay node;

buffering the location registration request signal of the user equipment transmitted from each user equipment after the relay node has moved between the tracking areas; and transmitting, by the relay node, a plurality of location registration request signals received from the user equipments during the prescribed time to the location information management unit by one location registration request message.

9. A relay node for relaying a user equipment and a base station, comprising:

a timer unit which measures a prescribed time from detecting that the relay node has moved between tracking areas;

a user equipment registration unit which registers the user equipment, which is a transmission source of a location registration request signal to a location information management unit, which manages location information, received by the relay node during the prescribed time, as a subordinate of the relay node;

a buffer unit which buffers the location registration request signal of the user equipment transmitted from each user equipment after the relay node has moved between the tracking areas; and a location registration request message transmission unit which gathers the location registration request signals of a plurality of user equipments which the buffer unit has buffered during the prescribed time together in one location registration request message, and transmits the one location registration request message to the location information management unit.

\* \* \* \* \*